Nov. 24, 1953  R. A. SANDBERG  2,660,412
HEAT EXCHANGE PANEL AND ITS METHOD OF MANUFACTURE
Filed March 17, 1949  3 Sheets-Sheet 1
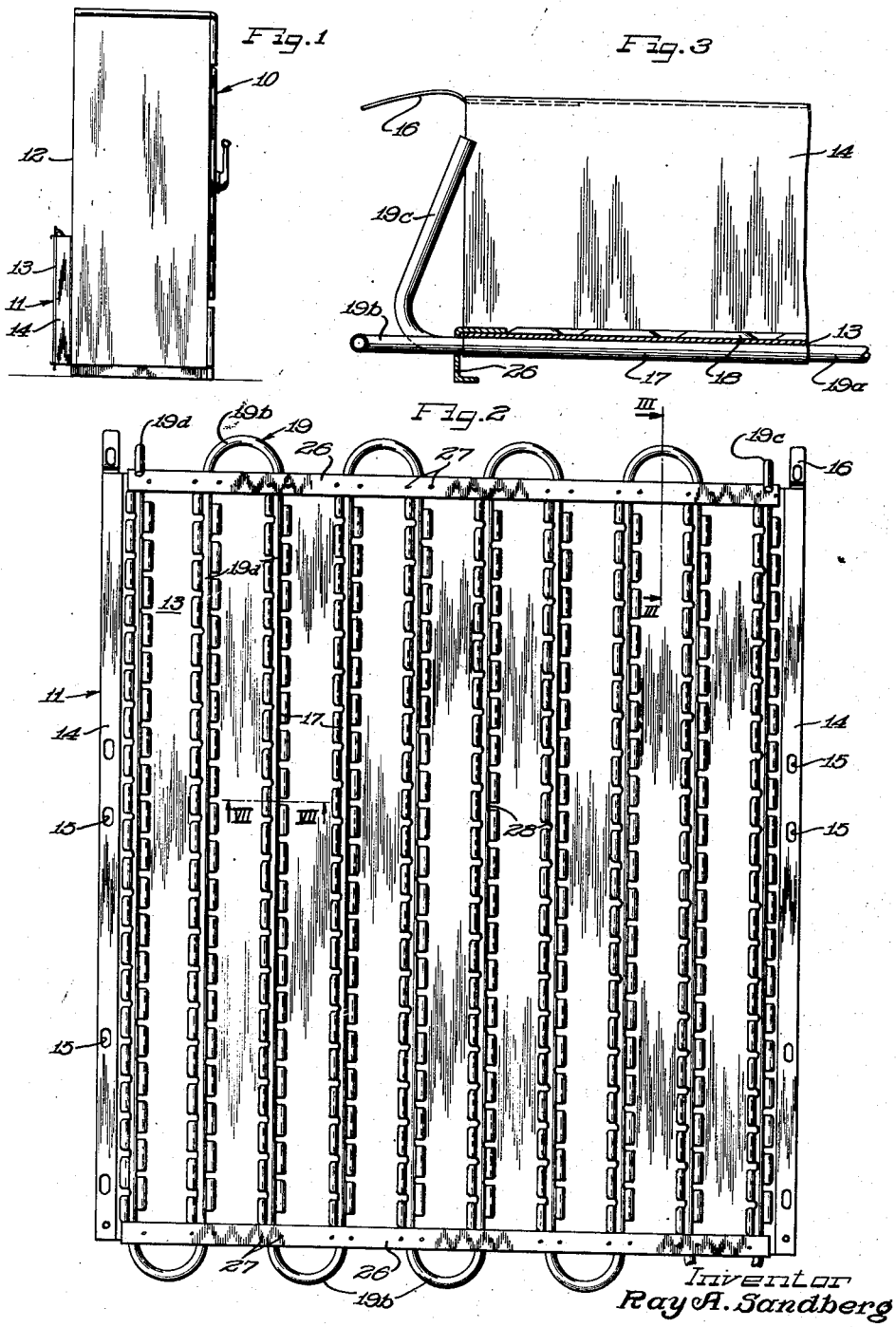
Inventor
Ray A. Sandberg
By The Firm of Charles W. Hills Attys Nov. 24, 1953    R. A. SANDBERG    2,660,412
HEAT EXCHANGE PANEL AND ITS METHOD OF MANUFACTURE
Filed March 17, 1949    3 Sheets-Sheet 2

Inventor
Ray A. Sandberg
By the Firm of Charles W. Hills
Attys

Nov. 24, 1953 R. A. SANDBERG 2,660,412
HEAT EXCHANGE PANEL AND ITS METHOD OF MANUFACTURE
Filed March 17, 1949 3 Sheets-Sheet 3
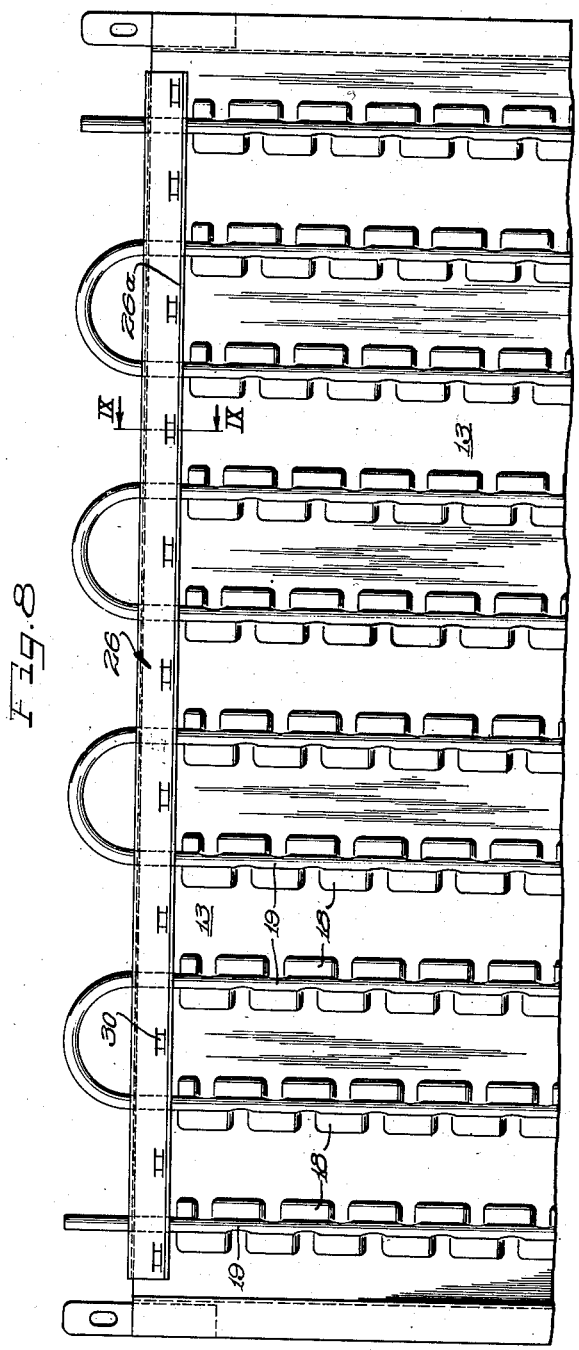
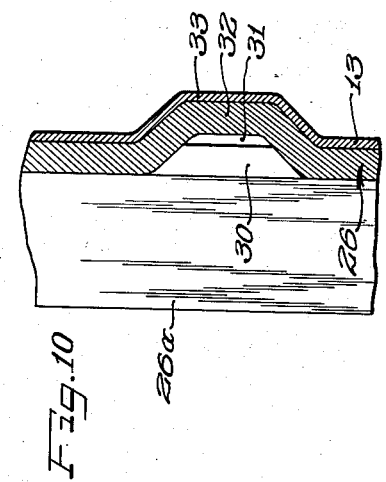
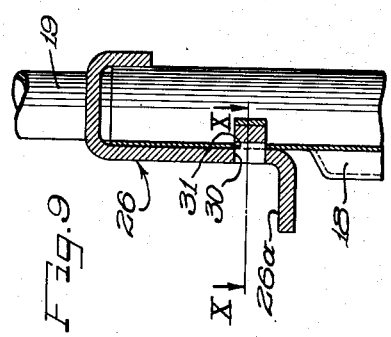
Inventor
Ray A. Sandberg
By The Firm of Charles W. Hill Attys Patented Nov. 24, 1953

2,660,412

UNITED STATES PATENT OFFICE 2,660,412

HEAT EXCHANGE PANEL AND ITS METHOD OF MANUFACTURE

Ray A. Sandberg, Waukegan, Ill., assignor to Houdaille-Hershey Corporation, North Chicago, Ill., a corporation of Michigan Application March 17, 1949, Serial No. 81,970

4 Claims. (Cl. 257—256)

The present invention relates to a heat exchanger and to a method of making the same, and more particularly to a tube and plate type of heat exchanger and to a method for economically manufacturing such a heat exchanger.

Tube and plate type heat exchangers have long been used in various kinds of refrigeration apparatus, such as domestic refrigerators. Heat exchangers of this type are presently manufactured by securing an elongated, sinuous tube to a backing plate having desirable heat transfer properties, the tube being secured to the backing plate by brazing, soldering or welding.

It has also been proposed that the tube be secured within a shallow recess or groove in the backing plate by deformation of the plate into overlapping contact with the tube. However, it has proved difficult to economically manufacture heat exchangers of this type inasmuch as it has been necessary to provide a recess or groove of the same sinuous configuration as that of the tube and also since deformation of the plate to overlap the tube has resulted in distortion of the plate out of its original plane.

The present invention now provides an improved tube and plate type of heat exchanger in which a sinuous tube is secured to a backing plate without the disadvantages and manufacturing difficulties previously encountered. The sinuous tube of the heat exchanger of the present invention is provided with elongated, substantially parallel, straight portions of such length as to extend across the entire width of the backing plate. Thus, the curved portions of the sinuous tube joining the straight portions, upon assembly of the tube and plate, extend beyond the backing plate and it is not necessary to provide a curved plate groove or recess for receiving curved portions of the tube.

The heat exchanger of the present invention is also provided with elongated, channel-shaped supporting members for extending along the length of the backing surface to reinforce the same and to correct any distortion caused by deformation of the backing plate during assembly of the tube within the grooves. These channel-shaped reinforcing members are provided with elongated slots for receiving curved portions of the sinuous tube so that the tube extending beyond the edge of the backing plate also extends beyond the reinforcing members.

Thus, the present invention provides an improved, simple, and readily manufactured heat exchanger of the tube and plate type in which the disadvantages of prior art heat exchangers are eliminated. The extension of the curved portions of the sinuous tube beyond the backing plate makes unnecessary the provision of the complicated sinuous groove patterns in the backing plate, and the provision of reinforcing members for the backing plate corrects any distortion caused by plate deformation during fabrication of the heat exchanger.

It is, therefore, an important object of the present invention to provide an improved, inexpensive, readily manufactured heat exchanger of the tube and plate type.

It is another important object of the present invention to provide a simple method for the manufacture of plate and tube type heat exchangers without the necessity of forming a complicated groove pattern in the backing plate for receiving a sinuous tube.

A further object of the present invention is to provide an improved heat exchanger of the plate and tube type in which curved portions of the tube extend beyond the confines of a backing surface with the adjacent edges of the backing surface being reinforced by suitable means to correct distortion of the backing surface caused during manufacture of the heat exchanger.

Other and further important objects of this invention will be apparent from the disclosures in the specification and the accompanying drawings.

On the drawings:

Figure 1 is a side, elevational view of a refrigerator equipped with a heat exchanger of the present invention;

Figure 2 is an elevational view of a heat exchanger of the present invention;

Figure 3 is an enlarged sectional view taken along the plane III—III of Figure 2;

Figure 8 is a fragmentary, enlarged elevational view of a modified form of heat exchanger of the present invention;

Figure 9 is an enlarged, fragmentary sectional view taken along the plane IX—IX of Figure 8; and Figure 10 is an enlarged fragmentary sectional view taken along the plane X—X of Figure 9.

As shown on the drawings:

Figure 4:
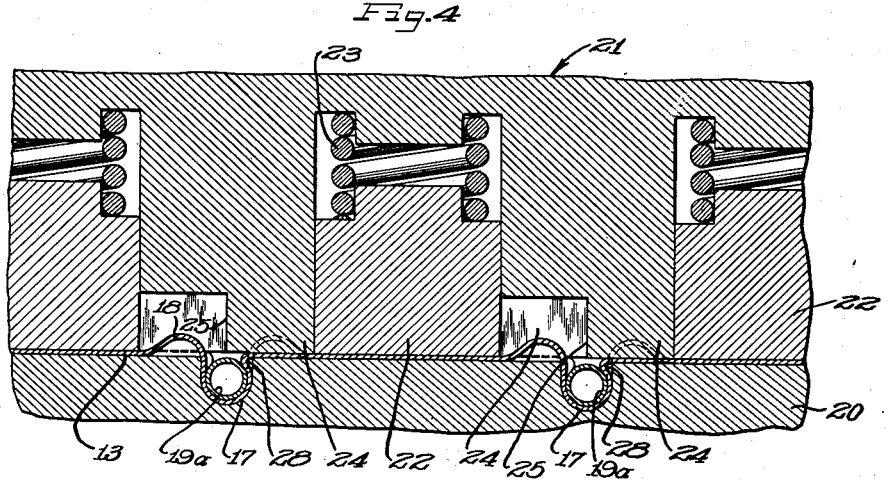
Figure 4 is an enlarged, fragmentary, sectional view illustrating a step in the manufacture of a heat exchanger of the present invention.

In Figure 1, reference numeral 10 refers generally to a conventional domestic refrigerator of the mechanical type having a heat exchanger 11 of the present invention secured to a rear wall 12 thereof.

As shown in greater detail in Figure 2, the heat exchanger 11 comprises generally a plane backing plate 13 formed of relatively thin gauge metal sheet having good thermal conducting properties. The backing plate 13 is provided with in-turned side mounting flanges 14 for securing the heat exchanger 11 to the refrigerator 10 as shown in Figure 1. The side mounting flanges 14 are apertured at spaced points, as at 15, and are provided with additional apertured mounting flanges 16 adjacent one end to aid in securing the heat exchanger to the refrigerator.

As best shown in Figures 2 and 4, the plate 13 is also provided with a plurality of elongated grooves 17 extending in spaced parallel relation across the entire width of plate 13. The grooves 17 may be formed by a suitable stamping or rolling operation and, following the formation of the grooves, the metal adjacent the grooves is gathered, as at 18, to provide a ridge or an upstanding projection, extending along the entire length of each of the grooves 17.

A continuous length of sinuous tube 19 is provided for positioning within the grooves 17, the tubing 19 being of such size as to be bottomed snugly within the grooves 17 and being of a diameter less than the depth of said grooves. From Figure 2 it may be seen that the sinuous tubing 19 is provided with straight portions 19a in the grooves 17 and curved portions 19b of 180° joining the parallel straight portions 19a. Only the straight portions 19a of tube 19 are inserted in the straight grooves 17 so that it is not necessary to provide a groove of sinuous contour for the plate 13 due to the curve portions 19b of tube 19 beyond the edges of the plate 13.

To secure the tubing portions 19a to the backing plate 13, a set of dies illustrated in Figure 4 may be employed. The embossed plate 13, formed with grooves 17 and with the tubing portions 19a seated in the grooves, is positioned on a backing die 20 having suitable depressions formed therein to receive the grooved portions 17 of backing plate 13. A movable die assembly, indicated generally at 21 and positioned above the plate 13, includes spaced holding dies 22 backed by compression springs 23 mounted within the movable die block 21.

The holding dies 22 are adapted to engage the surface of sheet 13 to secure the sheet 13 between the movable die block 21 and backing die 20 and to prevent movement of the plane portions of the metal laterally away from the depressions or grooves 17 during the forming operation. The movable die block 21 is provided with depending punches 24 which are movable downwardly with the movable die block 21 into engagement with the upstanding ribs 18 at spaced points along their length. The punches are cut away, as at 25, so that the ridges 18 are engaged at staggered intervals along their lengths. Thus, the flattened portions of ridges 18 are staggered as shown in Figure 2.

It will be seen that the engagement of ridges 18 by the punches 24 not only forces the ridges 18 downwardly at the engaged point but also causes the upstanding portion 18 to be deformed into tight engagement, as at 28, with the wall of that portion of the tube 19a directly beneath the punch. The cold working of the metal by this operation causes the deformed ridge portion 28 to take a permanent resilient set inwardly toward the tube 19a to resiliently grip the tube. The offset punching arrangement makes possible the alternate engagement of the tube at spaced intervals to anchor the tube securely within the deformed backing plate.

Figure 5:
Figure 5 is a fragmentary, sectional view of a heat exchanger showing the distortion caused by deformation of the backing plate during fabrication of the heat exchanger.

Due to the cold working and deformation of the backing plate 13 to cause this engagement with the tube 19, distortion of the plate may occur. The actual stretching and deformation of the plate will cause the plate to buckle or bend slightly from a true planar configuration into an arcuate cross-sectional configuration as shown in Figure 5 of the drawings.

Figure 6:
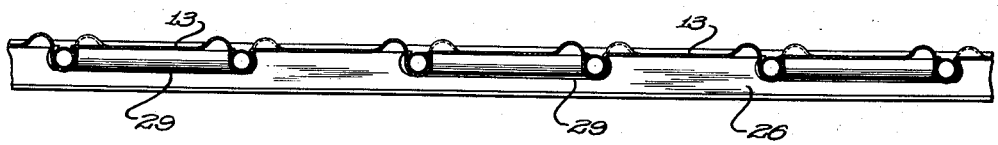
Figure 6 is a fragmentary, sectional view similar to Figure 5 illustrating the correction of such distortion of the backing plate.
Figure 7:
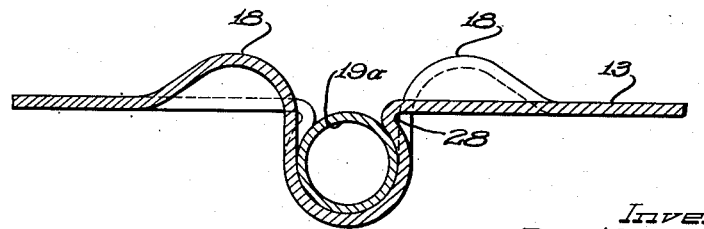
Figure 7 is a fragmentary, sectional view taken along the plane VII—VII of Figure 2.

This distortion of the plate is remedied by the provision of a channel-shaped end member or reinforcing channel 26 for each end of the backing plate 13. One such channel member 26 is shown in Figures 3 and 6, in which it may be seen that the member 26 is provided with a plurality of elongated slots 29, each dimensioned to loosely receive a curved portion 19b of the sinuous tube 19. The member 26 is slipped over the end of the curved portion 19b of tube 19 and brought into abutment with the adjacent end of plate 13. The plate 13 is then secured to the channeled member 26 by suitable means, as by spot-welding, indicated at 27, on either side of each of the grooves, there being two welds between each pair of adjacent grooves.

However, I prefer to employ the fastening means shown in Figure 8 to secure a reinforcing channel 26 to each end of the backing plate 13. Actually, as noted in Figure 9, the channel 26 therein shown is of slightly different form than that shown in Figure 3 of the drawings, the upper leg of the channel member 26 being provided with upstanding terminal flange portion 26a for lending increased rigidity to the terminal end of the upper leg of the channel.

As indicated in Figures 8–10, inclusive, both the upper leg of the channel 26 and the marginal portion of the backing plate 13 lying thereneath are pierced, as at 30 and 31, respectively, to form a pair of parallel, coextensive cuts extending through the overlapped members as shown in Figure 8. The members are next secured together by stamping or otherwise distorting from their respective original positions those portions of the overlapped members lying between the parallel cuts. The deformed portions of the overlapping members, indicated by reference numerals 32 and 33, in Figures 9 and 10, are deformed inwardly of the backing plate 13. The adjacent marginal edges of the cuts 30 and 31, in cooperation with the deformed portions 32 and 33, prevent both longitudinal and transverse displacement of the reinforcing channel 26 relative to the backing plate 13. Each channel is thus secured to the plate between each pair of adjacent grooves.

This method of fastening the members against relative movement may be carried out in a single, or successive, piercing and stamping operation, and the advantages residing in the elimination of the welding of the members and the necessity for employing welding equipment, together with the necesary labor, will be readily understood.

By the securing of the reinforcing channel 26 to opposing edges of the backing plate 13, the distortion of the backing plate shown in Figure 5 will be corrected so that the plate 13 lies in a single plane, as shown in Figure 6. The straightening of the distorted plate 13 will cause the deformed portions 28 of ridges 18 to bear even more tightly against the adjacent portion of the tube 19, thus increasing the gripping action of the plate upon the tube. It will be observed that the reinforcing channels contact the opposed ends of the plate over the entire transverse extent of the ends of plate and that the channel surfaces adjacent the ends and overlying the ends contact the ends over a substantial proportion of the area of such channel surfaces.

Following assembly of the heat exchanger as hereinbefore described, the exchanger is next secured to the rear wall 12 of the refrigerator 10 by means of the apertured end flanges 14 and the additional flange 16, and the ends 19c and 19d of tube 19 are connected into the coolant line of the refrigeration apparatus. For example, end 19c of tube 19 may be connected to the refrigerator compressor line and the end 19d of the tube 19 may be connected to the high pressure side of the refrigeration system so that compressed coolant passing through the heat exchanger 11 will be cooled as a portion of the conventional refrigerating cycle.

From the foregoing description, it may be readily seen that the present invention provides an improved heat exchanger of the tube and plate type, the curved portions 19b of the sinuous tube 19 extending beyond the confines of backing plate 13 so that it is not necessary to provide backing plate grooves or recesses of complicated contour to receive the sinuous tube. Further, the present invention provides means for correcting distortion of the backing plate caused by deformation of the same into retaining contact with the tube. This correction of distortion is accomplished by the use of channeled fastening means 26 which also serves to strengthen and rigidify the entire heat exchanger construction. Also, the correction of distortion causes the deformed portions 28 of ridges 18 to more closely grip the tube, thus improving the heat transfer properties of the exchanger as well as further insuring against separation of the backing plate and the tube.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. The method of making a heat exchanger which comprises forming a plurality of spaced, parallel grooves in a metal plate, placing lengths of a tube in said groove, deforming portions of said plate adjacent said grooves into surface contact with said tube to maintain the same in position within said grooves, positioning a planar reinforcing member to overlap opposite ends of said plate, piercing overlapping portions of said plate and said reinforcing member between each pair of adjacent grooves, and deforming said plate and said reinforcing member from the plane thereof to secure the same in assembled relation to correct distortion of the plate caused by deformation of the same into contact with said tube.

2. A heat exchanger comprising a substantially plane metal backing plate having a plurality of spaced parallel grooves formed therein, a sinuous tubing having straight lengths mounted in each of said grooves and retained within said grooves by portions of the plate overlying a diameter of said tubing and in engagement therewith, planar rigid reinforcing strips secured at spaced points to those opposite ends of said plate that lie transversely of the length of said grooves, each point of securement being between a pair of grooves, said planar rigid strips constraining said plate to retain a planar configuration, and the curvate portions of said sinuous tubing joining said straight lengths being beyond the edges of the plate and outside said reinforcing strips.

3. A heat exchanger comprising a substantially plane metal backing plate having a plurality of spaced parallel grooves formed therein and extending through opposed end edges thereof, a tubing having bends extending beyond said opposed end edges and having straight lengths mounted in each of said grooves and retained within said grooves by portions of the plate overlying a greater than semi-peripheral surface of said tubing and in engagement therewith, narrow planar rigid reinforcing strips secured to said plate along said opposed end edges thereof inside the bends of the tubing and overlying all of said straight tube lengths, and securing means fastening said plate along said opposed end edges to said planar strips between each adjacent pair of grooves, said planar rigid strips constraining said plate to a planar configuration, and said securing means comprising pierced overlapping portions of said plate and said reinforcing strips deformed from the plane thereof.

4. A heat exchanger comprising a substantially plane metal backing plate having a plurality of spaced parallel grooves formed therein and extending through opposed end edges thereof, a tubing having bends extending beyond said opposed end edges and having straight lengths mounted in each of said grooves and retained within said grooves by portions of the plate overlying a greater than semi-peripheral surface of said tubing and in engagement therewith, narrow planar rigid reinforcing strips secured to said plate along said opposed end edges thereof inside the bends of the tubing and overlying all of said straight tube lengths, and securing means fastening said plate along said opposed end edges to said planar strips between each adjacent pair of grooves, said planar rigid strips constraining said plate to a planar configuration, and said securing means comprising a portion of each of said reinforcing strips offset from the plane thereof and deformed into interlocking relation with an adjacent portion of said plate between each adjacent pair of grooves.

RAY A. SANDBERG.

References Cited in the file of this patent

UNITED STATES PATENTS

| Number | Name | Date |
|---|---|---|
| 56,494 | Gordon | July 17, 1866 |
| 1,704,409 | Scott | Mar. 5, 1929 |
| 1,800,150 | Musgrave et al. | Apr. 7, 1931 |
| 2,038,912 | Sumners | Apr. 28, 1936 |
| 2,091,584 | Brown | Aug. 31, 1937 |
| 2,171,790 | Higham | Sept. 5, 1939 |
| 2,190,288 | Higham | Feb. 13, 1940 |
| 2,197,150 | Lambert | Apr. 16, 1940 |
| 2,273,157 | Teeney | Feb. 17, 1942 |
| 2,281,299 | Steenstrup | Apr. 28, 1942 |
| 2,306,385 | Herter | Dec. 29, 1942 |
| 2,441,463 | Achs | May 11, 1948 |
| 2,517,212 | Kafer et al. | Aug. 1, 1950 |
| 2,582,358 | Schoellerman | Jan. 15, 1952 |
| 2,585,043 | Sandberg | Feb. 12, 1952 |

FOREIGN PATENTS

| Number | Country | Date |
|---|---|---|
| 197,187 | Great Britain | May 10, 1923 |
| 348,329 | Great Britain | May 14, 1931 |
| 891,592 | France | Dec. 11, 1943 |